UNITED STATES PATENT OFFICE.

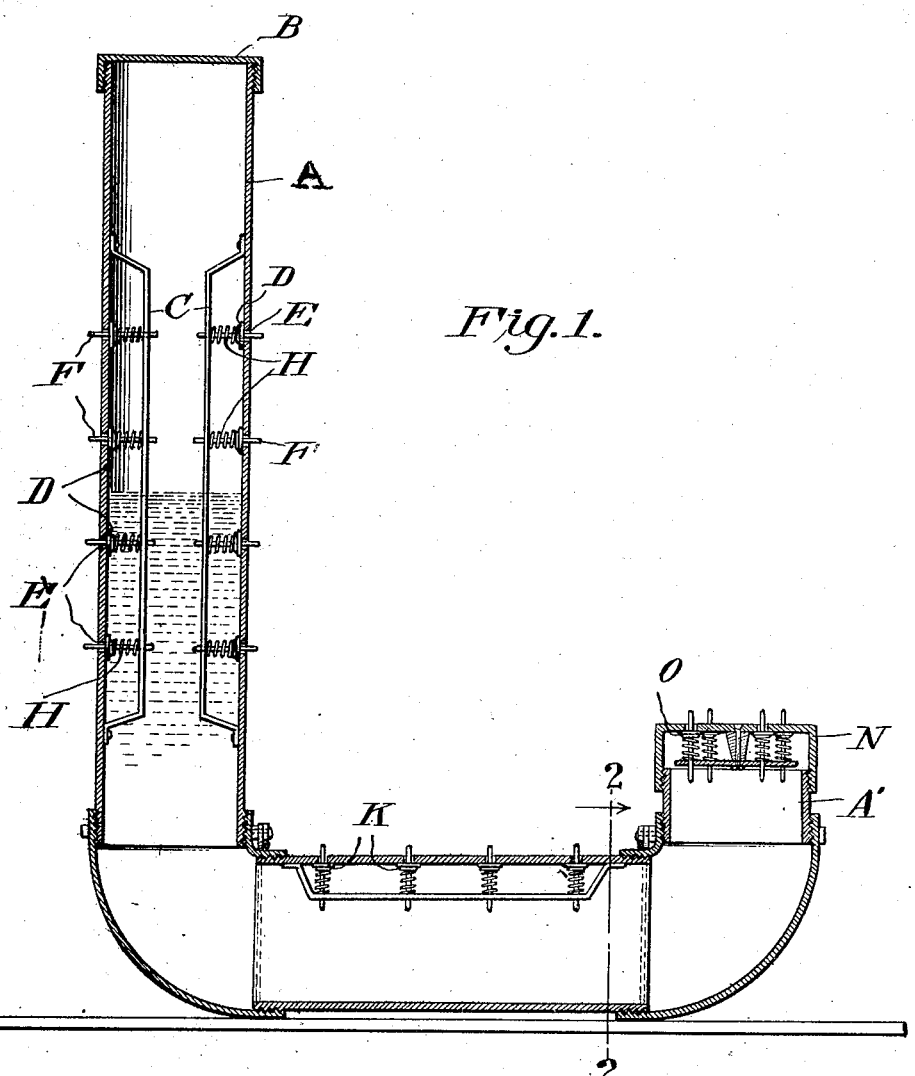
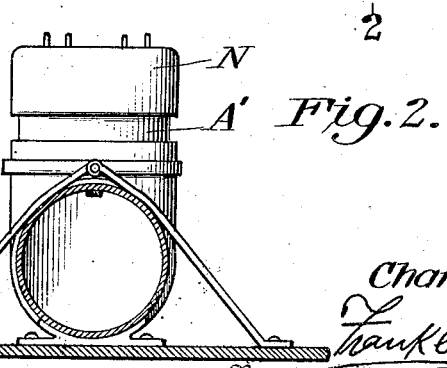

CHARLES GOEDEN, OF FORDYCE, NEBRASKA.

RUBBING-POST.

1,138,553.

Specification of Letters Patent.

Patented May 4, 1915.

Application filed October 9, 1914. Serial No. 865,882.

*To all whom it may concern:*

Be it known that I, CHARLES GOEDEN, a citizen of the United States, residing at Fordyce, in the county of Cedar and State of Nebraska, have invented certain new and useful Improvements in Rubbing-Posts; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in dipping posts adapted to contain a solution of a chemical which is allowed to flow through valve-regulated apertures when the swine rubs against the outer ends of the stems of valves.

The invention comprises a simple and efficient apparatus of this nature having various details of construction, combinations and arrangements of parts which will be hereinafter fully described, shown in the accompanying drawings and then specifically defined in the appended claim.

My invention is illustrated in the accompanying drawings, in which:

Figure 1 is a central vertical sectional view through my improved dipping post, and Fig. 2 is a cross sectional view on line 2—2 of Fig. 1.

Reference now being had to the details of the drawings by letter, A designates a pipe having a vertical or upright portion with a cap B fitted to its upper end. The opposite side of the upright portion of the pipe has bracket members C secured to the inner surface thereof at points diametrically opposite, and D designate valves which regulate apertures E formed in the walls of the pipe and each valve is fixed to a stem F.

H designates a spring which is mounted upon each stem and interposed between the valve and the bracket member C, said springs tending to normally hold the valves seated. The outer ends of the stems project through the apertures in the pipe and against which the swine is adapted to press when rubbing against the post, thus causing the valve to unseat and allow the contents of the pipe to flow out upon the animal rubbing against the same. The fluid contained in the receptacle is adapted to have medicinal qualities which will moisten the skin of the animal as it rubs against the post. The horizontally disposed part of the pipe, it will be noted, also has similar valves K which control apertures therein, and a cap N is fitted over the upturned end of the portion A′ and is provided with valves O which are spring-pressed and normally held seated.

By the provision of an apparatus embodying the features of my invention, it will be noted that a simple and efficient rubbing post is afforded whereby the animal will automatically cause the liquid to flow from the pipe as it runs against the ends of the stems to unseat the valve. After the animal has left the post, the spring will return the valves to their closed positions and thus shut off the further flow of the liquid.

What I claim to be new is:

A dipping post comprising a stand pipe communicating at its lower end with a laterally extending reservoir terminating in an upwardly extending capped end which is apertured, valves regulating the apertures in the capped end, the stems of the valves projecting through the apertures, said stand pipe adapted to contain liquid under pressure which, when the valves in the cap are opened, will flow through the apertured cap, said stand pipe and laterally extending portion being provided with apertures, and stemmed valves regulating the same.

In testimony whereof I hereunto affix my signature in presence of two witnesses.

CHARLES GOEDEN.

Witnesses:
EDWARD J. LUKES,
P. F. O'GARA.